United States Patent
Iwano et al.

(10) Patent No.: US 10,766,204 B2
(45) Date of Patent: Sep. 8, 2020

(54) JOINING DEVICE

(71) Applicant: TOYOTA JIDOSHA KABUSHIKI KAISHA, Toyota-shi, Aichi-ken (JP)

(72) Inventors: Yoshihiro Iwano, Toyota (JP); Kosuke Sakurai, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 16/249,204

(22) Filed: Jan. 16, 2019

(65) Prior Publication Data

US 2019/0263071 A1    Aug. 29, 2019

(30) Foreign Application Priority Data

Feb. 23, 2018    (JP) ................................. 2018-030766

(51) Int. Cl.
 *B29C 65/44*    (2006.01)
 *B29C 65/00*    (2006.01)
 *B29L 31/30*    (2006.01)

(52) U.S. Cl.
 CPC ............ *B29C 65/44* (2013.01); *B29C 66/742* (2013.01); *B29L 2031/30* (2013.01)

(58) Field of Classification Search
 CPC .............................. B29C 65/44; B29C 66/742
 See application file for complete search history.

(56) References Cited

U.S. PATENT DOCUMENTS

| | | | |
|---|---|---|---|
| 4,692,968 A | * | 9/1987 | Girard ................... B29C 65/608 24/116 R |
| 2013/0098534 A1 | * | 4/2013 | de Traglia Amancio Filho .......... B29C 66/21 156/73.5 |

FOREIGN PATENT DOCUMENTS

| EP | 0990808 A2 * | 4/2000 | ......... B29C 65/7814 |
|---|---|---|---|
| JP | H07-080944 A | 3/1995 | |

* cited by examiner

*Primary Examiner* — Robert B Davis
(74) *Attorney, Agent, or Firm* — Oliff PLC (57) ABSTRACT

A joining device includes: a holding portion that holds a shaft portion of a metal member, and that pushes the metal member toward one side in an axial direction of the shaft portion; a supporting portion that supports a thermoplastic resin member; a heating portion that heats a surface at the one side in the axial direction of a distal end portion, which is provided at the one side in the axial direction of the shaft portion, to a melting temperature of the thermoplastic resin member; a sleeve portion that is provided at an outer peripheral side of the holding portion, that is disposed so as to overlap with the distal end portion; and an outer tube portion that is provided at an outer peripheral side of the sleeve portion, an end portion of the outer tube portion abutting a surface of the thermoplastic resin member.

3 Claims, 4 Drawing Sheets

JOINING DEVICE

CROSS-REFERENCE TO RELATED APPLICATION

This application is based on and claims priority under 35 USC 119 from Japanese Patent Application No. 2018-030766 filed on Feb. 23, 2018, the disclosure of which is incorporated by reference herein.

BACKGROUND

Technical Field

The present invention relates to a joining device.

Related Art

Japanese Patent Application Laid-Open (JP-A) No. 7-80944 discloses an invention relating to a method of joining a plastic member (a thermoplastic resin member) and a metal member. In this method of joining a plastic member and a metal member, in a state in which a flange portion of the metal member is pushed against the plastic member, electric current is supplied to the metal member, and the plastic member is melted by the Joule heat generated at the metal member. Therefore, the flange portion of the metal member is embedded in the plastic member, and the plastic member and the metal member can be joined together securely.

However, in the above-described related art, the plastic member is joined to the metal member by melting the plastic member. Therefore, it is thought that, at the joined portion of the plastic member that is joined to the metal member, uneven portions of irregular shapes will arise at the periphery of the flange portion of the metal member.

SUMMARY

In view of the above-described circumstances, an object of the present invention is to provide a joining device that can suppress the generation of uneven portions of irregular shapes at the periphery of a metal member, at the joined portion of a thermoplastic resin member that is joined to the metal member, while joining the metal member and the thermoplastic resin member together securely.

A joining device of a first aspect of the present invention includes: a holding portion that is configured to hold a shaft portion of a metal member, and that is configured to push the metal member toward one side in an axial direction of the shaft portion in a state in which the shaft portion is held by the holding portion; a supporting portion that is configured to support a thermoplastic resin member from a surface of the thermoplastic resin member at the one side in the axial direction; a heating portion that is configured to heat a surface at the one side in the axial direction of a distal end portion, which structures a portion of the metal member and is provided at the one side in the axial direction of the shaft portion, to a temperature at which a thermoplastic resin that structures the thermoplastic resin member, melts; a sleeve portion that is tubular, that is provided at an outer peripheral side of the holding portion, that is disposed so as to overlap with the distal end portion as seen from the axial direction, and that is configured to move in the axial direction relative to the holding portion; an outer tube portion that is formed in a shape of a tube provided at an outer peripheral side of the sleeve portion and accommodating the metal member at an inner peripheral side thereof as seen from the axial direction, and that is configured to move in the axial direction relative to the sleeve portion, an end portion of the outer tube portion at the one side in the axial direction being configured to abut a surface of the thermoplastic resin member at another side in the axial direction.

In accordance with the joining device of the first aspect of the present invention, the shaft portion of the metal member can be held by the holding portion. The holding portion can push the metal member toward the one side in the axial direction of the shaft portion that is in a state of being held by the holding portion. Further, in the present aspect, the thermoplastic resin member can be supported by the supporting portion from the surface of the thermoplastic resin member at the one side in the axial direction.

Moreover, the present aspect has the heating portion. The surface at the one side in the axial direction of the distal end portion, which structures a portion of the metal member and is provided at the one side in the axial direction of the shaft portion, can be heated by the heating portion to a temperature at which the thermoplastic resin that structures the thermoplastic resin member can melt.

Therefore, in the present aspect, in the state in which the contacting portion of the thermoplastic resin member that contacts the metal member is melted, the metal member is pushed toward the thermoplastic resin member side, and the metal member can be joined to the thermoplastic resin member in the state in which the distal end portion of the metal member is embedded in the thermoplastic resin member.

By the way, it is thought that, when the distal end portion of the metal member becomes embedded in the thermoplastic resin member in the state in which the contacting portion of the thermoplastic resin member that contacts the metal member is melted, uneven portions of irregular shapes will arise at the thermoplastic resin member at the periphery of the distal end portion.

Here, the present aspect is provided with the sleeve portion that is tubular and is provided at the outer peripheral side of the holding portion, and the outer tube portion that is provided at the outer peripheral side of the sleeve portion. Further, the outer tube portion is a tubular shape that accommodates the metal member at the inner peripheral side as seen from the axial direction. The outer tube portion can move relative to the sleeve portion in the axial direction, and the end portion of the outer tube portion at the one side in axial direction can abut the surface of the thermoplastic resin member at another side in the axial direction.

Therefore, at the time of embedding the distal end portion of the metal member in the thermoplastic resin member, the end portion of the outer tube portion at the one side in the axial direction can be set in a state of being made to abut the surface of the thermoplastic resin member at another side in the axial direction. As a result, even if the molten thermoplastic resin starts to flow in directions of moving away from the metal member, that thermoplastic resin can be dammed-up at the inner peripheral side of the outer tube portion.

On the other hand, the sleeve portion is disposed in a state of overlapping the distal end portion of the metal member as seen from the axial direction, and can move relative to the holding portion in that axial direction. Therefore, in the state in which the molten thermoplastic resin is dammed-up by the outer tube portion, if the sleeve portion moves toward the one side in the axial direction of the shaft portion relative to the holding portion, the sleeve portion contacts that thermoplastic resin. As a result, in the present aspect, at another side in the axial direction of the distal end portion of the metal member, the thermoplastic resin that is in the molten state can be molded by the outer tube portion and the sleeve portion.

A joining device of a second aspect of the present invention further has, in the joining device of the first aspect, further comprising a restricting portion that restricts relative rotation between the metal member and the holding portion around the axial direction, wherein the heating portion is a driving portion that, in a state in which the surface at the one side in the axial direction of the distal end portion is made to abut the thermoplastic resin member, rotates or swings the holding portion around the axial direction and is configured to heat the surface by friction between the surface and the thermoplastic resin member.

In accordance with the joining device of the second aspect of the present invention, rotation of the metal member and the holding portion around the axial direction is restricted by the restricting portion. Due thereto, when the holding portion is rotated or swung around the axial direction by the driving portion, the metal member also is rotated or swung around that axial direction together with the holding portion. Further, when, in the state in which the surface at one side in the axial direction of the distal end portion of the metal member is made to abut the thermoplastic resin member, the metal member is rotated or swung around the axial direction, that surface is heated to a temperature at which the thermoplastic resin that structures the thermoplastic resin member can melt, by the friction between that surface and the thermoplastic resin member. As a result, in the present aspect, the contacting portion of the thermoplastic resin member that contacts the metal member is melted, and the distal end portion of the metal member becomes embedded in the thermoplastic resin member while the molten thermoplastic resin enters into the minute uneven portions at the surface at the one side in the axial direction of the distal end portion of the metal member.

In a joining device of a third aspect of the present invention, in the joining device of the second aspect, the metal member further has a held portion that is provided at the one side in the axial direction of the shaft portion and at the other side in the axial direction of the distal end portion, and that is configured to be held by the sleeve portion, a held-portion-side flat surface portion that runs along the axial direction is provided at the held portion, a sleeve-side flat surface portion, that is made to abut the held-portion-side flat surface portion and that can restrict relative rotation between the sleeve portion and the metal member around the axial direction, is provided at the sleeve portion, and the sleeve portion is configured to rotate around the axial direction.

In accordance with the joining device of the third aspect of the present invention, the metal member has the held portion that can be held by the sleeve portion. This held portion is provided at the one side in the axial direction of the shaft portion and another side at the axial direction of the distal end portion. The held-portion-side flat surface portions that run along the axial direction are provided at the held portion. On the other hand, the sleeve-side flat surface portions, which are made to abut the held-portion-side flat surface portions and which can restrict the relative rotation of the sleeve portion and the metal member around the axial direction, are provided at the sleeve portion, and the sleeve portion can rotate around that axial direction. Therefore, in the present aspect, the holding portion, the metal member and the sleeve portion can be synchronously rotated around the axial direction, and the generation of friction between the holding portion and the sleeve portion at the time when the holding portion rotates around that axial direction can be suppressed.

As described above, the joining device of the first aspect of the present invention has the excellent effect of being able to suppress the generation of uneven portions of irregular shapes at the periphery of the metal member, at the joined portion of the thermoplastic resin member that is joined to the metal member, while joining the metal member and the thermoplastic resin member together securely.

The joining device of the second aspect of the present invention has the excellent effect of being able to more securely join the metal member and the thermoplastic resin member by an anchoring effect.

The joining device of the third aspect of the present invention has the excellent effect that, at the time of joining the metal member and the thermoplastic resin member, the metal member can be rotated in a stable state, and wear of the holding portion and the sleeve portion can be suppressed.

BRIEF DESCRIPTION OF THE DRAWINGS

Exemplary embodiments of the present invention will be described in detail based on the following figures, wherein.

DETAILED DESCRIPTION

An example of a joining device relating to the present embodiment is described hereinafter by using FIG. 1 through FIG. 3D.

Figure 1:
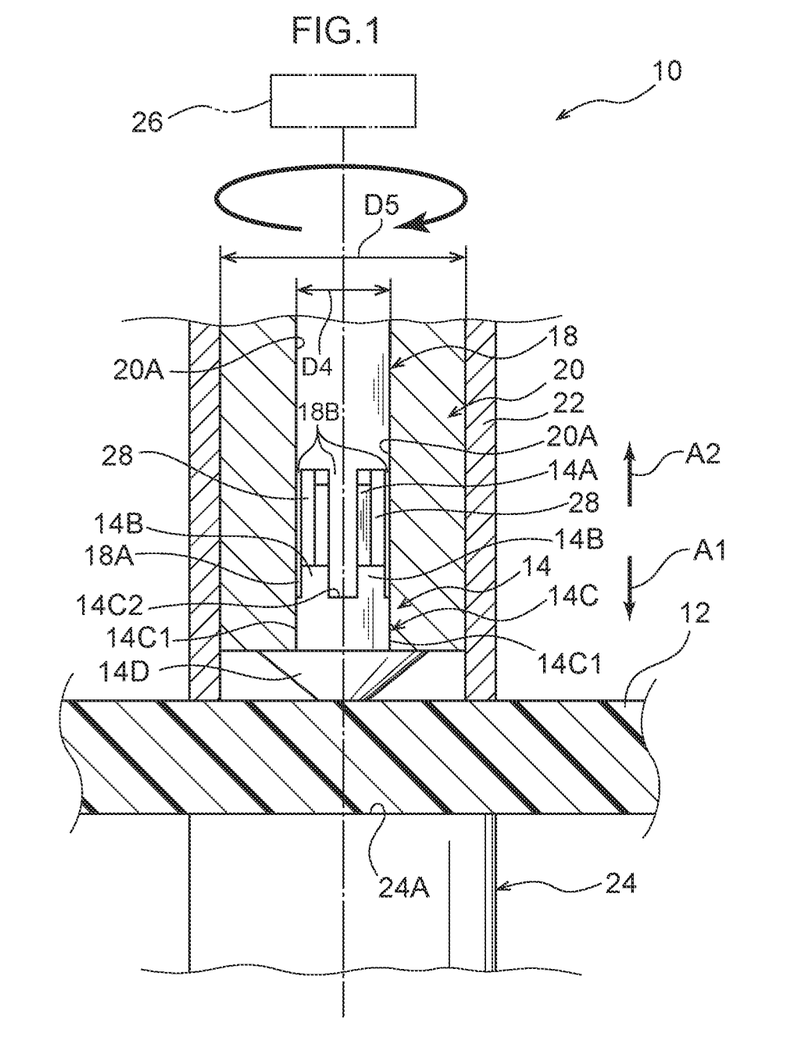
FIG. 1 is a partial sectional view that schematically shows the states of main portions of a joining device relating to a present embodiment, a metal member, and a thermoplastic resin member at a time of operation of the joining device.

First, the structures of a thermoplastic resin member 12 (hereinafter called resin member 12) and a metal member 14 that are joined by a joining device 10 relating to the present embodiment are described by using FIG. 1, FIG. 2A and FIG. 2B.

The resin member 12 is a plate-shaped member that structures a portion of a vehicle body such as, for example, the spare tire house of the vehicle body floor, or the like. The resin member 12 is formed by a thermoplastic resin such as, for example, a carbon fiber reinforced thermoplastic. Note that the resin member 12 is not limited to the above, and may be a vehicle body structural member or the like that is structured by another type of thermoplastic resin.

On the other hand, the metal member 14 is structured by a metal such as iron or the like as an example, and is a stud bolt that has a shaft portion 14A, projecting portions 14B that serve as restricting portions, a held portion 14C, and a distal end portion 14D.

Figure 2A:
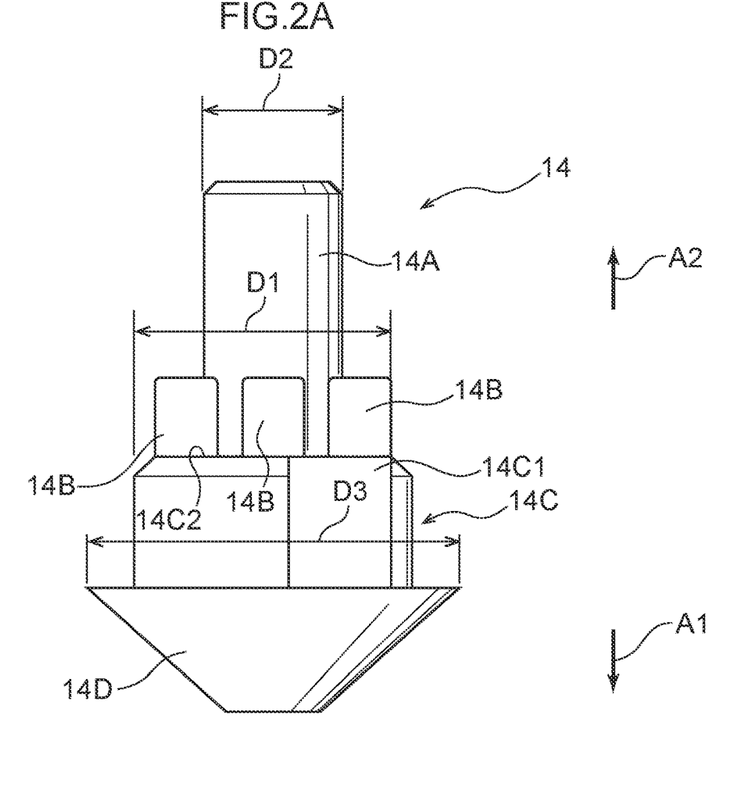
FIG. 2A is a side view showing the structure of the metal member that is to be joined to the thermoplastic resin member by the joining device relating to the present embodiment.
Figure 2B:
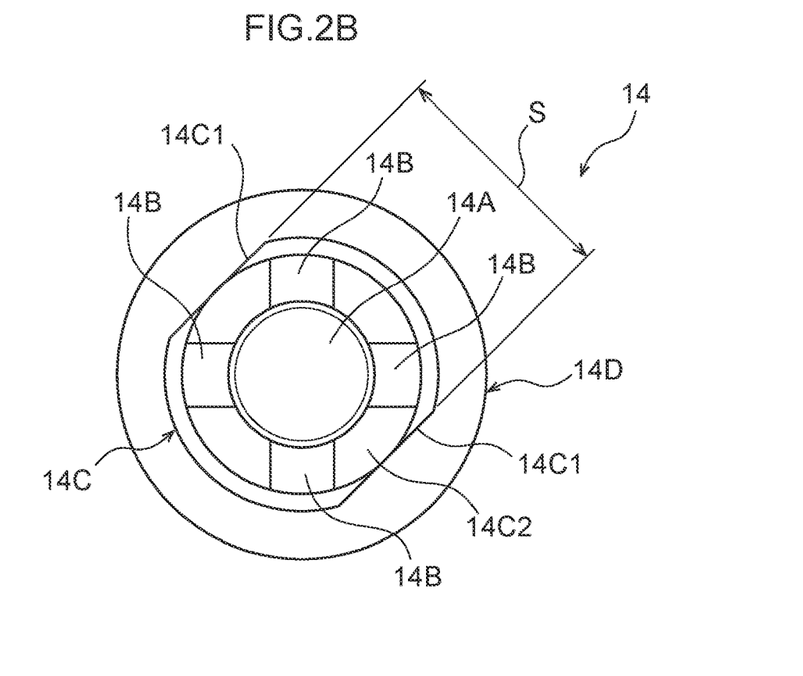
FIG. 2B is a plan view showing the structure of the metal member that is to be joined to the thermoplastic resin member by the joining device relating to the present embodiment.

In detail, as shown in FIG. 2A and FIG. 2B, the shaft portion 14A is solid cylindrical, and an unillustrated male screw portion is provided at the outer peripheral surface thereof. The held portion 14C is provided at the shaft portion 14A at one side in a length direction of the shaft portion 14A. Note that, in FIG. 1 through FIG. 3, one side in an axial direction of the shaft portion 14A is indicated by arrow A1, and another side in the axial direction of the shaft portion 14A is indicated by arrow A2. Further, in the following description, the one side in the axial direction of the shaft portion 14A is simply called the one side in the axial direction, and another side in the axial direction of the shaft portion 14A is simply called another side in the axial direction, unless specified otherwise.

The held portion 14C is basically formed in the shape of a solid cylinder whose axial direction is the axial direction of the shaft portion 14A, and whose outer diameter D1 is set to be a dimension that is around two times an outer diameter D2 of the shaft portion 14A. A pair of flat surface portions 14C1 that serve as held-portion-side flat surface portions are provided at the outer peripheral surface of the held portion 14C. These flat surface portions 14C1 are respectively formed so as to run along the axial direction of the shaft portion 14A and so as to be parallel to one another. Further, the distal end portion 14D is provided at the one side in the axial direction of the held portion 14C.

The distal end portion 14D is shaped such that the cross-sectional shape as seen from the peripheral direction of the shaft portion 14A is uniform in that peripheral direction. As an example, the distal end portion 14D is formed in a truncated cone shape whose diameter increases from the one side in the axial direction toward another side in the axial direction. Note that outer diameter D3 of the portion of the largest diameter at the distal end portion 14D is set to a dimension that is around 1.2 times to 1.5 times the outer diameter D1.

The projecting portions 14B are provided integrally with the shaft portion 14A and the held portion 14C, and are shaped as substantially quadrangular pillars that project-out from the outer peripheral surface of the shaft portion 14A toward the radial direction outer side of the shaft portion 14A, at another side in the axial direction from a flat surface portion 14C2 that is at another side in the axial direction of the held portion 14C. Four of the projecting portions 14B are formed at 90° intervals in the peripheral direction of the shaft portion 14A.

The structure of the joining device 10 is described next by using mainly FIG. 1. The joining device 10 has a holding portion 18, a sleeve portion 20, an outer tube portion 22, a supporting portion 24, and a driving portion 26 serving as a heating portion.

The holding portion 18 is formed overall in the shape of a cylindrical tube, and can hold the shaft portion 14A of the metal member 14 at the distal end portion side (the one side in the axial direction) portion thereof. In detail, the holding portion 18 can accommodate the shaft portion 14A at the inner side thereof, in a state in which the inner peripheral surface of the holding portion 18 abuts the outer peripheral surface of the shaft portion 14A of the metal member 14, and the axial direction of the holding portion 18 and the axial direction of the shaft portion 14A coincide. Note that outer diameter D4 of the holding portion 18 is set to be the same dimension as a gap S between the pair of flat surface portions 14C1 that are provided at the shaft portion 14A.

Further, due to four slit portions 28, which run along the axial direction of the holding portion 18, being provided in a distal end portion 18A side portion of the holding portion 18, four anchor portions 18B that serve as restricting portions are provided. These anchor portions 18B are disposed at 90° intervals in the peripheral direction of the holding portion 19. The cross-sectional shape of each anchor portion 18B as seen from the axial direction of the holding portion 18 is substantially fan-shaped. Further, the respective anchor portions 18B can be fit between the projecting portions 14B that are adjacent to one another in the peripheral direction of the shaft portion 14A. Note that the axial direction dimension of the holding portion 18 at the anchor portions 18B is set to be a dimension that is longer than the dimension of the shaft portion 14A in the axial direction thereof. Further, in the state in which the holding portion 18 is holding the shaft portion 14A of the metal member 14, the anchor portions 18B are fit between the projecting portions 14B that are adjacent in the peripheral direction of the shaft portion 14A.

The sleeve portion 20 is shaped as a cylindrical tube that can accommodate, at the inner side thereof, the holding portion 18 and the held portion 14C of the metal member 14, and is provided at the outer peripheral side of the holding portion 18. Further, the shape of the peripheral edge portion of the inner peripheral surface of the sleeve portion 20 as seen from the axial direction of the sleeve portion 20 is a shape that is the same as the shape of the peripheral edge portion of the cross-section, which is seen from the axial direction of the shaft portion 14A, at the held portion 14C, and the held portion 14C can be held in a state of fitting-together with the sleeve portion 20. Further, a pair of flat surface portions 20A that serve as sleeve-portion-side flat surface portions are provided at the inner peripheral surface of the sleeve portion 20.

These flat surface portions 20A are respectively formed so as to run along the axial direction of the sleeve portion 20 and so as to be parallel to one another, and can abut the flat surface portions 14C1 of the metal member 14. In the state in which the flat surface portions 14C1 of the metal member 14 and the flat surface portions 20A of the sleeve portion 20 are abutting, relative rotation of the metal member 14 around the axial direction of the shaft portion 14A with respect to the sleeve portion 20 is restricted. Further, relative movement of the sleeve portion 20 in the axial direction and relative rotation of the sleeve portion 20 around the axial direction, with respect to the holding portion 18 as a unit, are permitted.

Moreover, in the state in which the metal member 14 is being held by the sleeve portion 20, as seen from the axial direction of the shaft portion 14A, the distal end portion 14D of the metal member 14 and the sleeve portion 20 overlap. Namely, the end portion of the sleeve portion 20 at the one side in the axial direction (the distal end portion 18A side of the holding portion 18) can abut the distal end portion 14D of the metal member 14. Further, the sleeve portion 20 is pushed toward the one side in the axial direction thereof (the distal end portion 18A side of the holding portion 18) by an unillustrated sleeve-portion-side pushing portion.

On the other hand, in the state in which the metal member 14 is being held by the holding portion 18 and the sleeve portion 20, the sleeve portion 20 can rotate around the axial direction thereof in a state in which relative movement around that axial direction with respect to the holding portion 18 is restricted. Note that outer diameter D5 of the sleeve portion 20 is set to a dimension that is around 1.2 times to 1.5 times the outer diameter D4 of the holding portion 18.

The outer tube portion 22 is formed in the shape of a cylindrical tube that can accommodate the sleeve portion 20 at the inner side thereof, and is provided at the outer peripheral side of the sleeve portion 20. This outer tube portion 22 can rotate relative to the sleeve portion 20 around the axial direction thereof, and is pushed toward the one side in the axial direction thereof (the distal end portion 18A side of the holding portion 18) by an unillustrated outer-tube-portion-side pushing portion.

The supporting portion 24 is block-shaped and is made of metal, and can support the resin member 12 that is disposed at a supporting surface portion 24A of the supporting portion 24 and that is pushed by the outer tube portion 22. In detail, in the state in which the metal member 14 is being held at the holding portion 18, an end portion of the outer tube portion 22 at the one side in the axial direction, which is pushed by the outer-tube-portion-side pushing portion, is made to abut the surface of the resin member 12 at another side in the axial direction, and pushes this surface. Further, in this state, the resin member 12 is in a state in which the surface at the one side in the axial direction thereof is supported by the supporting portion 24.

The driving portion 26 has an unillustrated motor or the like, and is connected to an unillustrated proximal end portion side of the holding portion 18, and can cause the holding portion 18 to rotate or swing around the axial direction of the holding portion 18. Further, an unillustrated holding-portion-side pushing portion is disposed at the side, which is opposite the holding portion 18, of the driving portion 26. The holding portion 18 is pushed toward the one side in the axial direction thereof (the distal end portion 18A side of the holding portion 18) by the holding-portion-side pushing portion. Due thereto, due to the holding-portion-side pushing portion operating in a state in which the metal member 14 is held by the holding portion 18 and the resin member 12 is supported by the supporting portion 24, the surface at the one side in the axial direction of the distal end portion 14D can be pushed-against the resin member 12. Further, due to the driving portion 26 being driven in this state, the surface at the one side in the axial direction of the distal end portion 14D is heated to a temperature at which the thermoplastic resin, which structures the resin member 12, can be melted by the friction between that surface and the resin member 12.

Operation and Effects of Present Embodiment

Operation and effects of the present embodiment are described next.

In the present embodiment, the metal member 14 is joined to the resin member 12 via the joining processes that are illustrated in FIG. 3A through FIG. 3D. Concretely, first, in a first step shown in FIG. 3A, the metal member 14 is held by the holding portion 18 and the sleeve portion 20. Further, in the state in which the surface at the one side in the axial direction of the distal end portion 14D is made to abut the resin member 12, the outer tube portion 22 is pushed by the outer-tube-portion-side pushing portion, and the resin member 12 that is pushed by the outer tube portion 22 is supported by the supporting portion 24.

Figure 3A:
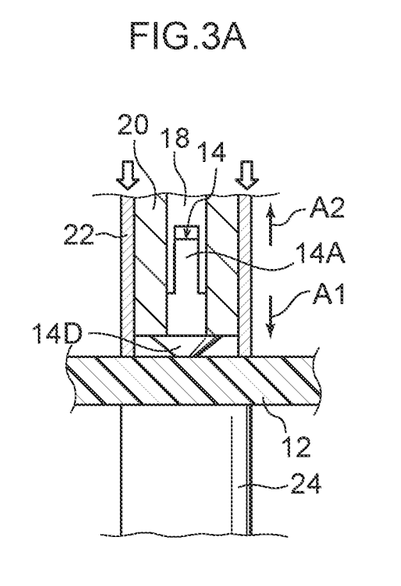
FIG. 3A is a partial sectional view that is seen from a direction orthogonal to an axial direction of the metal member, and that shows a first step in a process of joining the metal member and the thermoplastic resin member by the joining device relating to the present embodiment.
Figure 3B:
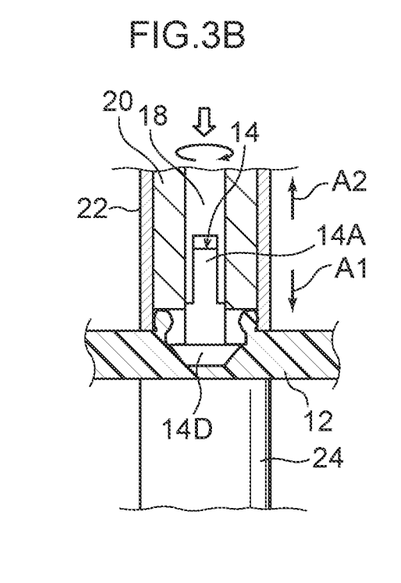
FIG. 3B is a partial sectional view that is seen from the direction orthogonal to the axial direction of the metal member, and that shows a second step in the process of joining the metal member and the thermoplastic resin member by the joining device relating to the present embodiment.

Next, in a second step that is shown in FIG. 3B, in a state in which the holding-portion-side pushing portion is pushing the holding portion 18 toward the resin member 12 side via the driving portion 26, the holding portion 18 is rotated or swung around the axial direction of the shaft portion 14A, and the portion, which contacts the distal end portion 14D, of the resin member 12 is melted, and the distal end portion 14D enters into the interior of the resin member 12.

Figure 3C:
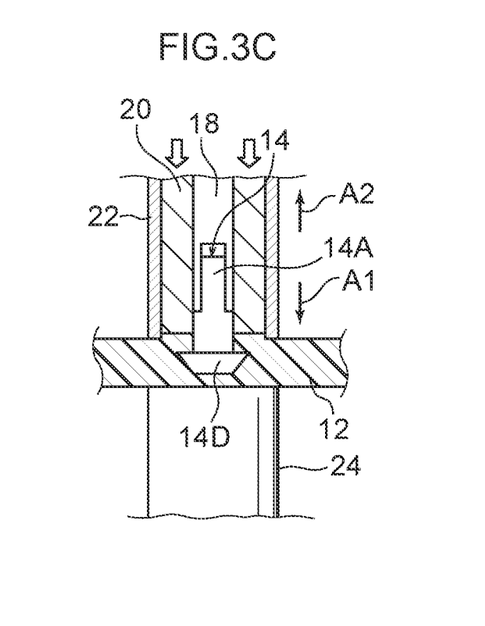
FIG. 3C is a partial sectional view that is seen from the direction orthogonal to the axial direction of the metal member, and that shows a third step in the process of joining the metal member and the thermoplastic resin member by the joining device relating to the present embodiment.

Next, in a third step that is shown in FIG. 3C, due to the thermoplastic resin, which is in a molten state and is dammed-up by the outer tube portion 22, being pushed by the sleeve portion 20, the thermoplastic resin is molded into a disc shape at another side in the axial direction of the distal end portion 14D, and a projecting portion 12A is formed at the resin member 12.

Figure 3D:
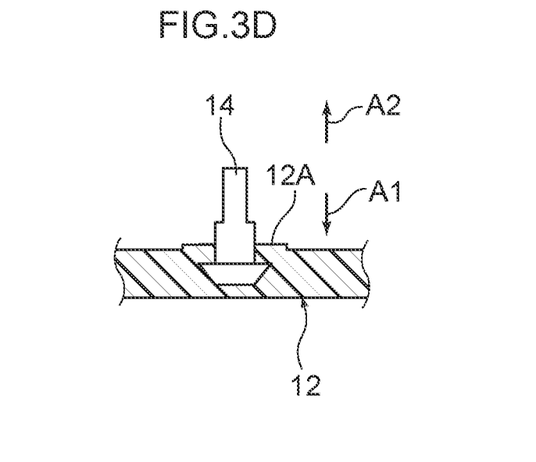
FIG. 3D is a partial sectional view that is seen from the direction orthogonal to the axial direction of the metal member, and that shows a fourth step in the process of joining the metal member and the thermoplastic resin member by the joining device relating to the present embodiment.

Finally, in a fourth step that is shown in FIG. 3D, in the state in which the thermoplastic resin, which was molded in the third step, has solidified, the respective structural elements of the joining device 10 are removed from the metal member 14 and the resin member 12.

Further, at the joining device 10 that is structured as described above, as shown in FIG. 1, the shaft portion 14A of the metal member 14 can be held by the holding portion 18, and the holding portion 18 can push the metal member 14 toward the one side in the axial direction of the shaft portion 14A. Further, in the present embodiment, the resin member 12 can be supported by the supporting portion 24 from the surface of the resin member 12 at the one side in the axial direction.

Moreover, in the present embodiment, the driving portion 26 is provided, and the surface at the one side in the axial direction of the distal end portion 14D of the metal member 14 can be heated by the driving portion 26 to a temperature at which the thermoplastic resin that structures the resin member 12 can melt. Therefore, in the present embodiment, in the state in which the contacting portion of the resin member 12 that contacts the metal member 14 is melted, the metal member 14 is pushed toward the resin member 12 side, and the metal member 14 can be joined to the resin member 12 in a state in which the distal end portion 14D of the metal member 14 is embedded in the resin member 12.

By the way, it is thought that, when the distal end portion 14D of the metal member 14 becomes embedded in the resin member 12 in the state in which the contacting portion of the resin member 12 that contacts the metal member 14 is melted, uneven portions of irregular shapes will arise at the resin member 12 at the periphery of the distal end portion 14D.

Here, the present embodiment is provided with the sleeve portion 20 that is tubular and is provided at the outer peripheral side of the holding portion 18, and the outer tube portion 22 that is provided at the outer peripheral side of the sleeve portion 20. Further, the outer tube portion 22 is a tubular shape that accommodates the metal member 14 at the inner peripheral side as seen from the axial direction of the shaft portion 14A. The outer tube portion 22 can move relative to the sleeve portion 20 in that axial direction, and the end portion of the outer tube portion 22 at the one side in the axial direction can abut the surface of the resin member 12 at another side in the axial direction.

Therefore, at the time of embedding the distal end portion 14D of the metal member 14 in the resin member 12, the end portion of the outer tube portion 22 at the one side in the axial direction can be set in a state of being made to abut the surface of the resin member 12 at another side in the axial direction. As a result, even if the molten thermoplastic resin starts to flow in directions of moving away from the metal member 14, that thermoplastic resin can be dammed-up at the inner peripheral side of the outer tube portion 22.

On the other hand, the sleeve portion 20 is disposed in a state of overlapping the distal end portion 14D of the metal member 14 as seen from the axial direction of the shaft portion 14A, and can move relative to the holding portion 18 in that axial direction. Therefore, in the state in which the molten thermoplastic resin is dammed-up by the outer tube portion 22, if the sleeve portion 20 moves toward the one side at the axial direction of the shaft portion 14A relative to the holding portion 18, the sleeve portion 20 contacts that thermoplastic resin. As a result, in the present embodiment, at another side in the axial direction of the distal end portion 14D of the metal member 14, the thermoplastic resin that is in the molten state can be molded by the outer tube portion 22 and the sleeve portion 20. Accordingly, in the present embodiment, at the joined portion of the resin member 12 that is joined with the metal member 14, the generation of uneven portions of irregular shapes at the periphery of the metal member 14 can be suppressed, while the metal member 14 and the resin member 12 are joined together securely. Moreover, the border portion at the resin member 12 that borders on the metal member 14 can be reinforced by the projecting portion 12A that is formed at the resin member 12.

Further, in the present embodiment, rotation of the metal member 14 and the holding portion 18 around the axial direction of the shaft portion 14A is suppressed by the projecting portions 14B that are provided at the metal member 14 and the anchor portions 18B that are provided at the holding portion 18. Due thereto, when the holding portion 18 is rotated or swung around the axial direction of the shaft portion 14A by the driving portion 26, the metal member 14 also is rotated or swung around that axial direction together with the holding portion 18. Further, when, in the state in which the surface at one side in the axial direction of the distal end portion 14D of the metal member 14 is made to abut the resin member 12, the metal member 14 is rotated or swung around the axial direction of the shaft portion 14A, due to the friction between that surface and the resin member 12, that surface is heated to a temperature at which the thermoplastic resin that structures the resin member 12 can melt. As a result, in the present embodiment, the contacting portion of the resin member 12 that contacts the metal member 14 is melted, and the distal end portion 14D of the metal member 14 becomes embedded into the resin member 12 while the molten thermoplastic resin enters into the minute uneven portions of the surface at the one side in the axial direction of the distal end portion 14D of the metal member 14. Accordingly, in the present embodiment, the metal member 14 and the resin member 12 can be joined more securely by an anchoring effect.

Moreover, in the present embodiment, the metal member 14 has the held portion 14C that can be held by the sleeve portion 20. This held portion 14C is provided at the one side in the axial direction of the shaft portion 14A and another side in the axial direction of the distal end portion 14D. The flat surface portions 14C1 that run along the axial direction of the shaft portion 14A are provided at the held portion 14C. On the other hand, the flat surface portions 20A, which are made to abut the flat surface portions 14C1 and which can restrict the relative rotation between the sleeve portion 20 and the metal member 14 around the axial direction of the shaft portion 14A, are provided at the sleeve portion 20, and the sleeve portion 20 can rotate around that axial direction. Therefore, in the present embodiment, the holding portion 18, the metal member 14 and the sleeve portion 20 can be synchronously rotated around the axial direction of the shaft portion 14A, and the generation of friction between the holding portion 18 and the sleeve portion 20 at the time when the holding portion 18 rotates around that axial direction can be suppressed.

Accordingly, in the present embodiment, at the time of joining the metal member 14 and the resin member 12, the metal member 14 can be rotated in a stable state, and wear of the holding portion 18 and the sleeve portion 20 can be suppressed. Moreover, in the state in which the metal member 14 is embedded in the resin member 12 up to the held portion 14C, the flat surface portions 20A function to prevent rotation of the metal member 14 with respect to the torque around the axial direction of the shaft portion 14A that is applied to the shaft portion 14A. Therefore, even if torque around the axial direction of the shaft portion 14A is applied to the shaft portion 14A in the state in which the metal member 14 and the resin member 12 are joined together, it is easy to maintain the joined state of the metal member 14 and the resin member 12.

Supplemental Description of Above Embodiments (1) In the above-described embodiments, the driving portion 26 is used as the heating portion, but the present invention is not limited to the same. A heater, which can melt the thermoplastic resin that structures the resin member 12 by Joule heat that is generated at the metal member 14 by causing current to flow to the metal member 14, may be used as the heating portion. Further, in the case of using such a structure, the shape of the distal end portion 14D of the metal member 14 may be changed appropriately.

(2) Further, in the above-described embodiment, the held portion 14C is provided at the metal member 14, but the present invention is not limited to the same. Namely, in accordance with the member that is to be mounted to the metal member 14, or the like, there may be a structure in which the held portion 14C is not provided at the metal member 14. Further, in accordance with the member that is to be mounted to the metal member 14, or the like, there may be a structure in which the male screw portion is not provided at the shaft portion 14A, and the shaft portion 14A is made to fit with a fit-together portion of the member that is to be mounted to the metal member 14, or the like.

What is claimed is:

1. A joining device, comprising:
    a holding portion that is configured to hold a shaft portion of a metal member, and that is configured to push the metal member toward one side in an axial direction of the shaft portion in a state in which the shaft portion is held by the holding portion;
    a supporting portion that is configured to support a thermoplastic resin member from a surface of the thermoplastic resin member at the one side in the axial direction;
    a heating portion that is configured to heat a surface at the one side in the axial direction of a distal end portion, which structures a portion of the metal member and is provided at the one side in the axial direction of the shaft portion, to a temperature at which a thermoplastic resin that structures the thermoplastic resin member, melts;

a sleeve portion that is tubular, that is provided at an outer peripheral side of the holding portion, that is disposed so as to overlap with the distal end portion as seen from the axial direction, and that is configured to move in the axial direction relative to the holding portion; and an outer tube portion that is formed in a shape of a tube provided at an outer peripheral side of the sleeve portion and accommodating the metal member at an inner peripheral side thereof as seen from the axial direction, and that is configured to move in the axial direction relative to the sleeve portion, an end portion of the outer tube portion at the one side in the axial direction being configured to abut a surface of the thermoplastic resin member at another side in the axial direction.

2. The joining device of claim 1, further comprising a restricting portion that restricts relative rotation between the metal member and the holding portion around the axial direction, wherein the heating portion is a driving portion that, in a state in which the surface at the one side in the axial direction of the distal end portion is made to abut the thermoplastic resin member, rotates or swings the holding portion around the axial direction and is configured to heat the surface by friction between the surface and the thermoplastic resin member.

3. The joining device of claim 2, wherein:

the metal member further has a held portion that is provided at the one side in the axial direction of the shaft portion and at the other side in the axial direction of the distal end portion, and that is configured to be held by the sleeve portion, a held-portion-side flat surface portion that runs along the axial direction is provided at the held portion, a sleeve-side flat surface portion, that is made to abut the held-portion-side flat surface portion and that can restrict relative rotation between the sleeve portion and the metal member around the axial direction, is provided at the sleeve portion, and the sleeve portion is configured to rotate around the axial direction.

* * * * *